April 3, 1951  O. M. WOODWARD, JR  2,547,802
TRANSMISSION LINE MEASURING SYSTEM
Filed Aug. 27, 1948
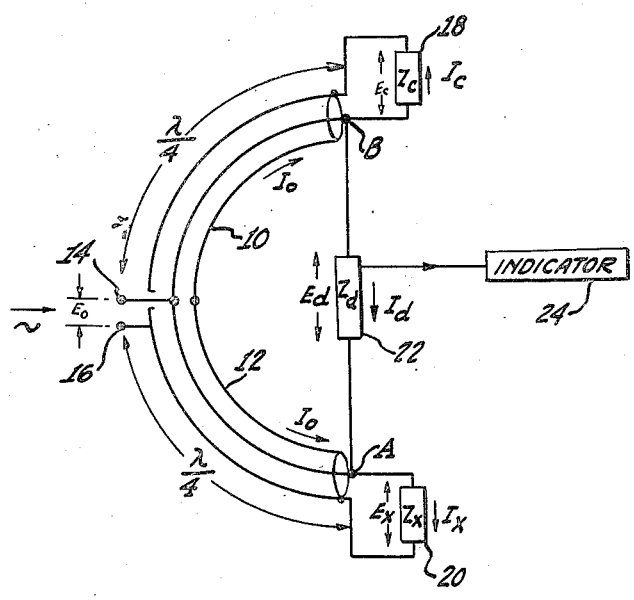
INVENTOR
OAKLEY M. WOODWARD, JR.
BY
ATTORNEY

Patented Apr. 3, 1951

2,547,802

UNITED STATES PATENT OFFICE

2,547,802

TRANSMISSION LINE MEASURING SYSTEM

Oakley M. Woodward, Jr., Princeton, N. J., assignor to Radio Corporation of America, a corporation of Delaware Application August 27, 1948, Serial No. 46,483

6 Claims. (Cl. 175—183)

This invention relates to improvements in transmission line measuring systems, and more particularly to an improved system for meeting a variety of measuring problems encountered in transmission line applications.

It is one object of the invention to provide an improved system for determining various characteristics of the load on a transmission line.

Another object is to provide an improved system for measuring the effect on a transmission line load of variations in the frequency of the energy supplied to the line.

A further object is to provide an improved device for measuring the reflection coefficient due to an unknown impedance on a transmission line.

Another object is to simplify the problem of matching variable loads to transmission lines of predetermined characteristic impedance.

According to the invention, the foregoing and other objects and advantages are attained by means of two quarter-wave transmission lines of the same characteristic impedance arranged to be fed from a common source of voltage. One of the lines is terminated in an impedance equal to the characteristic impedance of both lines, while any desired test impedance may be connected to the output of the other line. Means are provided for detecting and indicating differences in voltage which may exist at the outputs of the lines, and by a suitable selection of detecting means, different types of information may be obtained as to the characteristics of and the effects of the test impedance.

A more complete understanding of the invention may be had by reference to the following description of an illustrative embodiment thereof, when read in connection with the accompanying drawing, the single figure of which illustrates schematically the manner in which the principles of the invention may be applied.

Referring to the drawing, there are shown two co-axial type quarter-wave transmission lines 10 and 12, of the same characteristic impedance $Z_c$, connected to a pair of common input terminals 14, 16 through which high frequency voltage may be applied to the device from any suitable source (not shown). One of the lines 10 is terminated in an impedance 18 equal to the characteristic impedance $Z_c$ of both lines, while any desired test impedance 20 may be connected across the output of the other line 12. While the transmission lines 10, 12 have been shown as coaxial lines, it is obvious that other suitable types of transmission lines may be used if desired.

Means are also provided for detecting differences in voltage at the outputs of the lines 10, 12, and as shown in the drawing, such means may include a detector 22 connected between the output ends of the lines 10, 12. The detector 22 may be a crystal or any other suitable type of detector, and the output of the detector may be applied to an indicator 24, such as an oscilloscope, a meter, or any other well-known type of indicator.

The operation of the device shown in the drawing may be described as follows:

Since the two lines 10, 12 have a common feed point (the input terminals 14, 16), and since the lines are each a quarter wavelength long, then the currents $I_0$ flowing into the output junctions A, B will always be equal. The currents $I_0$ will be related to the input voltage $E_0$ by the equation (1) $\qquad E_0 = jI_0Z_c$ A summation of the currents at the junction A will give the equation (2) $\qquad I_0 + I_d = I_x$ where $I_d$ is the current through the detector 22 and $I_x$ is the current through the test impedance 20.

Similarly, a summation of the currents at the junction B will give the equation (3) $\qquad I_0 = I_d + I_c$ where $I_c$ is the current through the impedance 18.

The voltages $E_c$, $E_d$, and $E_x$, across the three impedances 18, 22, and 20, respectively, may be related by the expression (4) $\qquad E_c = E_d + E_x$ or (5) $\qquad I_cZ_c = I_dZ_d + I_xZ_x$ By substitution from Equations 1, 2, and 3, Equation 5 may be solved for $I_d$ in terms of $E_0$ and the impedances $Z_c$, $Z_d$, $Z_x$ as (6) $\qquad I_d = \left(\dfrac{jE_0}{Z_c}\right)\dfrac{Z_x - Z_c}{(Z_d + [Z_x + Z_c])}$ From Equation 6 it will be seen that, for a given constant input voltage $E_0$ and a given detector impedance $Z_d$, the detector current $I_d$ will be a function of the value $Z_x$ of the test impedance 20, and hence the effect of different test impedances, or the effect of frequency variations on any one test impedance can be determined by calibrating the indicator 24 in terms of the observed effect of a known impedance 20, and observing the comparative effects of changes in frequency or changes in the impedance $Z_x$.

If the impedance $Z_d$ of the detector 22 is very small, then from Equation 6, it can be seen that the output of the detector 22 will be a close approximation of the reflection coefficient $k$ due to the test impedance 20, where $$k = \frac{Z_x - Z_c}{Z_x + Z_c}$$

Hence, a device arranged in accordance with the invention will be well adapted for the determination of reflection coefficient.

As was previously mentioned, the indicator 24 may be a meter, an oscilloscope, or any other well known type of indicator. If the device is to be used primarily for measuring mismatching due to changes in frequency, an oscilloscope is particularly convenient since the vertical deflection axis may be calibrated in terms of departure from match, with the horizontal deflection axis calibrated in frequency units.

Since certain changes and modifications could be made in the system shown and described, all within the scope and spirit of the invention, the foregoing is to be construed as illustrative, and not in a limiting sense.

What is claimed is:

1. In a testing and measuring system for high frequency transmission line applications, in combination, two serially connected quarter-wave transmission lines of the same characteristic impedance, high frequency signal input means connected at the junction of said lines, a terminating impedance for one of said lines equal to said characteristic impedance, a test impedance terminating the other of said lines, and means connected directly between said terminating impedances for detecting and indicating voltage differences across said terminating impedance.

2. In a system of the character described, in combination a pair of input terminals adapted to be connected to a source of high frequency voltage, two quarter-wave transmission lines of the same characteristic impedance connected to said input terminals, means for connecting a test impedance across the output end of one of said lines, an impedance equal to said characteristic impedance connected across the output end of said second line, and means connected directly between said connecting means and said last named impedance for detecting and indicating the difference in voltage across the output ends of said lines.

3. In a system of the character described, in combination, a pair of input terminals adapted to be connected to a source of high frequency voltage, two quarter-wave transmission lines of the same characteristic impedance connected to said input terminals, means for connecting a test impedance across the output end of one of said lines, an impedance equal to said characteristic impedance connected across the output end of said second line, and means connected directly between the output ends of said lines for detecting and indicating the difference in voltage across the output ends of said lines.

4. In a system of the character described, in combination, a pair of input terminals adapted to be connected to a source of high frequency voltage, two quarter-wave transmission lines of the same characteristic impedance connected to said input terminals, means for connecting a test impedance across the output end of one of said lines, an impedance equal to said characteristic impedance connected across the output end of said second line, a detector connected directly between the output ends of said lines, and indicating means connected to the output of said detector.

5. In a system for measuring the reflection coefficient due to an unknown terminating impedance for a transmission line, in combination, two serially connected quarter-wave transmission lines of the same characteristic impedance, high frequency signal input means connected at the junction of said lines, a terminating impedance for one of said lines equal to said characteristic impedance, a terminating impedance of unknown characteristics for the other of said lines, and means connected directly between said terminating impedances for detecting and indicating voltage differences across said terminating impedances, the impedance of said last-mentioned means being very small in comparison with the magnitudes of said terminating impedances.

6. In a testing and measuring system for high frequency transmission line applications, in combination, two serially connected quarter-wave transmission lines of the same characteristic impedance, high frequency signal input means connected at the junction of said lines, means for connecting a test impedance across the output end of one of said lines, an impedance equal to said characteristic impedance connected across the output end of said second line, a detector connected directly between the output ends of said lines, and indicating means associated with said detector and responsive to changes in magnitude and polarity of the voltage across said detector.

OAKLEY M. WOODWARD, Jr.

REFERENCES CITED

The following references are of record in the file of this patent:

UNITED STATES PATENTS

| Number | Name | Date |
| --- | --- | --- |
| 2,416,790 | Barrow | Mar. 4, 1947 |
| 2,456,679 | Cork et al. | Dec. 21, 1948 |